(12) United States Patent
Stark et al.

(10) Patent No.: US 12,010,119 B2
(45) Date of Patent: Jun. 11, 2024

(54) SYSTEMS AND METHODS FOR REFRESHING TOKEN DATA

(71) Applicant: Visa International Service Association, San Francisco, CA (US)

(72) Inventors: Aaron Alexander Stark, San Francisco, CA (US); David Meaney, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 525 days.

(21) Appl. No.: 17/276,462

(22) PCT Filed: Sep. 20, 2018

(86) PCT No.: PCT/US2018/052073
§ 371 (c)(1),
(2) Date: Mar. 15, 2021

(87) PCT Pub. No.: WO2020/060559
PCT Pub. Date: Mar. 26, 2020

(65) Prior Publication Data
US 2022/0038460 A1 Feb. 3, 2022

(51) Int. Cl.
*H04L 29/06* (2006.01)
*G06F 16/23* (2019.01)
(Continued)

(52) U.S. Cl.
CPC .......... *H04L 63/10* (2013.01); *G06F 16/2379* (2019.01); *G06F 16/245* (2019.01); *H04L 63/0421* (2013.01)

(58) Field of Classification Search
CPC ..... H04L 63/10; G06F 16/2379; G06F 16/245
See application file for complete search history.

(56) References Cited

U.S. PATENT DOCUMENTS 5,761,647 A * 6/1998 Boushy .............. G06Q 30/0201
705/7.29
9,449,229 B1 * 9/2016 Laska .............. G08B 13/19606
(Continued)

FOREIGN PATENT DOCUMENTS

KR 20090103381 A 10/2009
WO 2004/043041 A1 5/2004
WO 2016149463 A1 9/2016

OTHER PUBLICATIONS

Written Opinion received for Singapore Application No. SG11202102621Y, dated Jan. 4, 2023, 6 pages.
(Continued)

*Primary Examiner* — Vance M Little
(74) *Attorney, Agent, or Firm* — Kilpatrick Townsend & Stockton LLP (57) ABSTRACT

A method is disclosed. A computer may receive a request message from an access device. The computer may search a supplemental database for updated supplemental data corresponding to a real credential. The supplemental database may store the real credential, supplemental data, and the updated supplemental data. The updated supplemental data may be provided to the supplemental database in connection with authorization processing involving the real credential. The computer may receive the updated supplemental data associated with the real credential. The computer may transmit a response message to the access device including the updated supplemental data. The request message may be, as examples, an authorization request message comprising a token or a token request message comprising a token.

11 Claims, 7 Drawing Sheets

(51) Int. Cl.
      *G06F 16/245*    (2019.01)
      *H04L 9/40*       (2022.01)

(56) References Cited

U.S. PATENT DOCUMENTS

| | | | | |
|---|---|---|---|---|
| 2006/0010442 | A1* | 1/2006 | Desai | H04L 63/10 |
| | | | | 718/100 |
| 2009/0173783 | A1* | 7/2009 | Fomitchev | G07F 7/1008 |
| | | | | 235/380 |
| 2010/0218233 | A1* | 8/2010 | Henderson | G06F 21/577 |
| | | | | 726/1 |
| 2012/0041881 | A1 | 2/2012 | Basu et al. | |
| 2015/0032625 | A1 | 1/2015 | Dill et al. | |
| 2016/0314211 | A1* | 10/2016 | Kerai | H04L 63/10 |
| 2018/0276344 | A1* | 9/2018 | Cochran | G06Q 50/184 |
| 2018/0285875 | A1* | 10/2018 | Law | G06Q 20/40 |

OTHER PUBLICATIONS

International Search Report and Written Opinion for International Appl. No. Application No. PCT/US2018/052073 dated Jun. 5, 2019, 10 pages.

* cited by examiner

| Account Identifier | Expiration Date | Change History |
|---|---|---|
| 123456789012 | 1/20 | |
| 4567891011 | 7/18 | |
| 444444444 | 8/20 | |
| 555555111 | 8/19 | |
| 94541561321 | 6/19 | |

304

| Account Identifier | Expiration Date | Change History |
|---|---|---|
| 123456789012 | 1/20 | |
| 4567891011 | 7/21  306 | 7/18 → 7/21 |
| 444444444 | 8/20 | |
| 555555111 | 8/19 | |
| 94541561321 | 6/19 | |

SYSTEMS AND METHODS FOR REFRESHING TOKEN DATA

CROSS-REFERENCES TO RELATED APPLICATIONS

This application is a 371 National Phase application of International Application No. PCT/US2018/052073 filed Sep. 20, 2018, the contents of which is incorporated by reference herein in its entirety.

BACKGROUND

Data may be used to obtain access to a resource or a location. For example, a portable device may include data which is passed to an access device to allow the user of the portable device to access a room in a building. In another example, the portable device may include access data such as account data which may allow the user of the portable device to access an account to obtain a good or service. The access data may correspond to a real credential, such as a social security number, primary account number (PAN), or personal identification number (PIN). However, users may not want to share real credentials with resource providers due to security concerns.

Therefore, secure and efficient systems and methods are needed to provide users with the capability to conduct transactions, while keeping real credentials hidden from resource providers. Hiding the real credentials reduces the risk both of fraud by the resource provider, as well as interception and misuse of the real credentials by reducing the number of parties to which the real credentials are communicated.

To accomplish this, tokens may be provisioned onto devices and utilized in place of the real credentials to conduct transactions with resource providers. A token may be used to substitute sensitive information (i.e., a real credential) with nonsensitive equivalent information which has little or no value in itself. The token may act as a reference that maps back to the real credential through a token service computer. The token service computer may be highly secured and isolated from other transaction processing entities, such as resource providers, reducing the risk of fraud and interception of the real credential by unauthorized parties.

A token service computer may provision a token based on a real credential and associated supplemental data. For example, the token may be provisioned based on an employee's social security number and date of last review, to allow the employee to access a building for one year after the date of last review. As another example, a token may be provisioned based on a primary account number and expiration date, for use in online transactions.

A service provider may receive updates regarding supplemental data in batches. As an example, an account issuer may send an update service computer (such as Visa® Account Updater) a list of primary account numbers with updated expiration dates at the end of each business day. However, if a particular expiration date is updated at the beginning of the business day, the service provider computer may have out-of-date information all day until the batch update is received at the end of the business day.

These latencies in updating the supplemental data may cause issues with token provisioning and/or usage. As an example, a token is provisioned to a device. Subsequently, supplemental data associated with the token is updated. The updated supplemental data is not sent to the token service computer prior to the token service computer receiving a request for access to a resource based on the token. Accordingly, when the token is used with the old supplemental data, access to the resource based on the token is denied. As another example, supplemental data associated with a real credential is updated by an issuer. However, the updated supplemental data is not sent to an access device storing the now-old supplemental data and the real credential. The token service computer receives a request to provision a token based on the real credential and the old supplemental data. Based on the old supplemental data, the provision request is declined.

Embodiments of the invention address these and other problems individually and collectively.

BRIEF SUMMARY

Embodiments of the invention include methods as well as systems that can provide updated token information, based on trusted data, with increased efficiency.

One embodiment of the invention is directed to a method comprising: receiving, by a computer from an access device, a request message; searching, by the computer, a supplemental database for updated supplemental data corresponding to a real credential, the supplemental database storing the real credential, supplemental data, and the updated supplemental data, wherein the updated supplemental data was provided to the supplemental database in connection with authorization processing involving the real credential; receiving, by the computer, the updated supplemental data associated with the real credential; and transmitting, by the computer, a response message to the access device including the updated supplemental data.

Another embodiment of the invention is directed to a system comprising a computer programmed to perform the above-noted method.

Another embodiment of the invention is directed to a method comprising: transmitting, by an access device to a computer, a request message; thereby causing the computer to generate a response message at least by: searching a supplemental database for updated supplemental data corresponding to a real credential, the supplemental database storing the real credential, supplemental data, and the updated supplemental data, wherein the updated supplemental data was provided to the supplemental database in connection with authorization processing involving the real credential, and wherein the computer received the updated supplemental data associated with the real credential; and, responsive to transmitting the request message, receiving, by the access device, the response message from the computer including the updated supplemental data corresponding to the real credential.

Another embodiment of the invention is directed to an system comprising an access device programmed to perform the above-noted method.

Further details regarding embodiments of the invention can be found in the Detailed Description and the Figures.

DETAILED DESCRIPTION

I. Definitions

Prior to discussing embodiments of the invention, some terms can be described in further detail.

A "portable device" may be any suitable device that may be operated by a user. For example, portable devices can be hand-held and compact so that they can fit into a user's wallet and/or pocket (e.g., pocket-sized). Portable devices may include smart cards, ordinary credit or debit cards (with a magnetic strip), keychain devices (such as the Speedpass™ commercially available from Exxon-Mobil Corp.), etc. Other examples of portable devices include cellular phones, personal digital assistants (PDAs), pagers, payment cards, security cards, access cards, smart media, transponders, and the like. The portable devices can also be debit devices (e.g., a debit card), credit devices (e.g., a credit card), or stored value devices (e.g., a stored value card). As additional examples, portable devices may include wearable devices (e.g., watches, rings, etc.). A portable device may comprise any suitable hardware and software for performing such functions, and may include multiple devices or components. A portable device may be pre-provisioned with token. For example, a portable device may be manufactured with a memory containing a token.

"Access data" may include any suitable data that can be used to access a resource or create data that can access a resource. In some embodiments, access data may be account information for a payment account. Account information may include a primary account number (PAN), payment token, expiration date, verification values (e.g., CVV, CVV2, dCVV, dCVV2), etc. In other embodiments, access data may be data that can be used to activate account data. In some embodiments, access data could include data that can be used to access a location. Such information may be ticket information for an event, data to access a building, transit ticket information, etc. In other embodiments, access data could include data that can be used to obtain a resource.

An "access device" may be any suitable device for obtaining access to a resource. An access device may generally be located in any suitable location, such as at the location of a merchant. An access device may be in any suitable form. Some examples of access devices include point of sale (POS) devices, cellular phones, personal digital assistants (PDAs), personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a portable device.

A "real credential" may be any suitable information that serves as reliable evidence of worth, ownership, identity, or authority. A real credential may be a string of numbers, letters, or any other suitable characters, as well as any object or document that can serve as confirmation. Examples of real credentials include access credentials, account credentials, value credentials, identification cards, and passcodes. For example, access credentials may comprise permissions to access certain tangible or intangible assets, such as a building or a file. In another example, payment credentials may include any suitable information associated with and/or identifying an account (e.g., a payment account and/or a payment device associated with the account). Such information may be directly related to the account or may be derived from information related to the account. Examples of account information may include an "account identifier" such as a primary account number (PAN, also referred to as an "account number"), a gift card number or code, a prepaid card number or code, a user name, an expiration date, a card verification value (CVV), a dynamic card verification value (dCVV), a card verification value 2 (CVV2), etc. An example of a PAN is a 16-digit number, such as "4147 0900 0000 1234." In some embodiments, real credentials may be considered sensitive information.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a PAN. For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "token issuer," "token provider," "token service computer," or "token service system" can include a system that services tokens. In some embodiments, a token service computer can facilitate requesting, determining (e.g., generating) and/or issuing tokens, as well as maintaining an established mapping of tokens to PANs in a repository (e.g., a token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the tokens to obtain the actual PANs. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "user" may include an individual. In some embodiments, a user may be associated with one or more personal accounts and/or user devices. The user may also be referred to as a cardholder, account holder, or consumer in some embodiments.

A "resource provider" may be an entity that can provide a resource such as goods, services, information, and/or access. Examples of resource providers includes merchants, data providers, transit agencies, governmental entities, venue and dwelling operators, etc. A resource provider may operate a resource provider computer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer.

An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction. In some embodiments, the authorization request message may comprise access data. In other embodiments, the authorization request message may comprise a real credential.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchants access device (e.g. POS equipment) that indicates approval of the transaction. The code may serve as proof of authorization.

"Authorization processing" or "authorization operations" may include at least generating and sending an authorization request message and/or authorization response message. Authorization processing may further include determining whether to authorize the transaction.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer-readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

II. Systems

Figure 1:
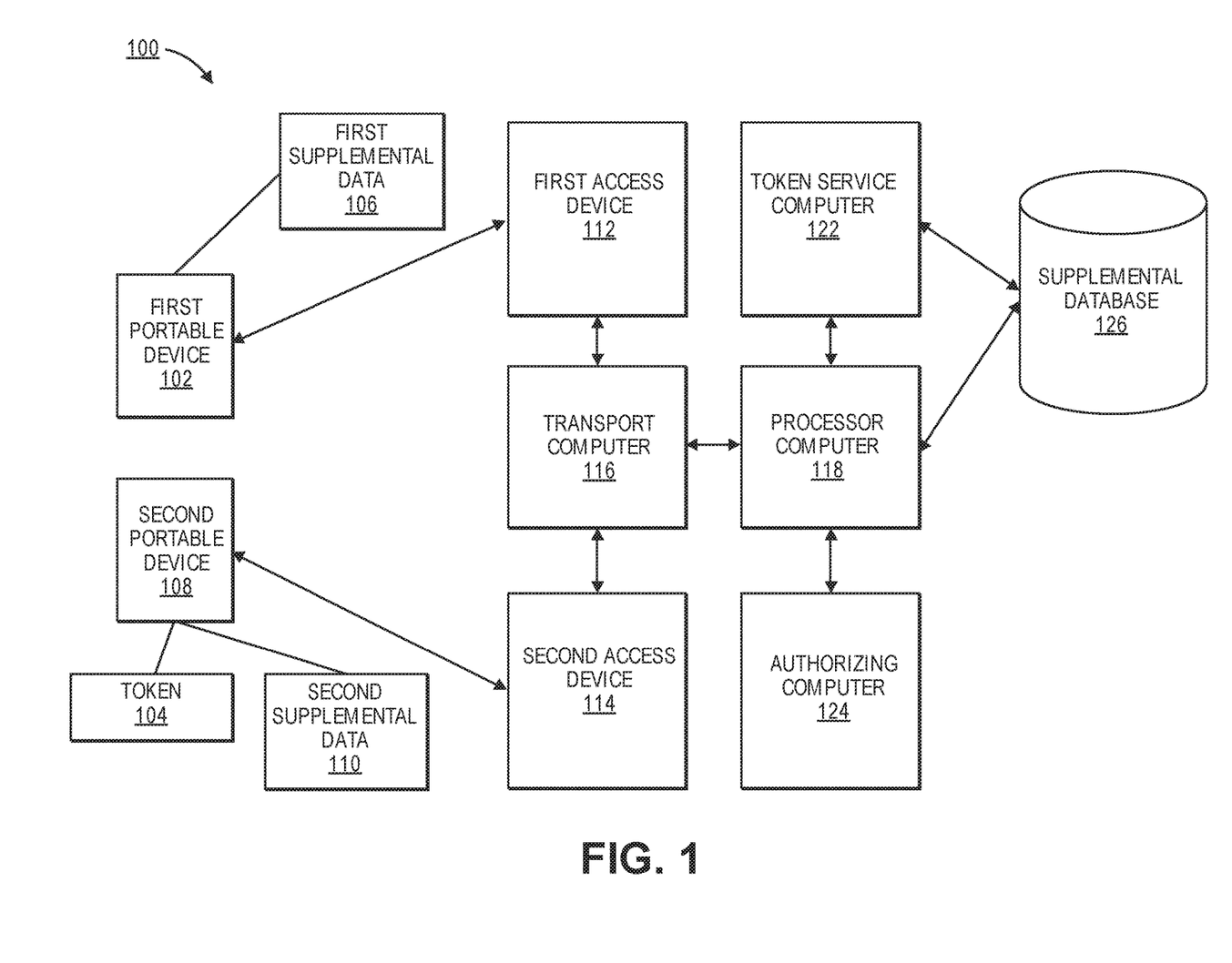
FIG. 1 shows a block diagram of a system according to an embodiment of the invention.

FIG. 1 shows a system comprising a number of components. For simplicity of illustration, a certain number of components are shown in FIG. 1. It is understood, however, that embodiments of the invention may include more than one of each component.

The system illustrated in FIG. 1 may comprise a first portable device 102, a token 104, first supplemental data 106, a second portable device 108, second supplemental data 110, a first access device 112, a second access device 114, a transport computer 116, a processor computer 118, a token service computer 122, an authorizing computer 124, and a supplemental database 126.

The first portable device 102 may be in operative communication with the first access device 112. In some embodiments, the first portable device 102 may be in close proximity to the first access device 112 (e.g., to allow near-field communication (NFC)). Similarly, the second portable device 108 may be in operative communication with the second access device 114. The processor computer 118 may be in operative communication with the transport computer 116, token service computer 122, authorizing computer 124, and supplemental database 126. The transport computer 116 may be in operative communication with the first access device 112, second access device 114, and processor computer 118. The token service computer 122 may be in operative communication with the processor computer 118 and supplemental database 126.

Messages between the processor computer 118, transport computer 116, token service computer 122, supplemental database 126, and authorizing computer 124 may be transmitted using a secure communication protocol such as, but not limited to, File Transfer Protocol (FTP); Hypertext Transfer Protocol (HTTP); Secure Hypertext Transfer Protocol (HTTPS), Secure Socket Layer (SSL), ISO (e.g., ISO 8583) and/or the like.

The first portable device 102 may be any suitable device. The first portable device 102 may store one or more real credentials.

The first supplemental data 106 may be data associated with a real credential and/or a token. As an example, the first supplemental data 106 is an expiration date associated with a primary account number. As another example, the first supplemental data is a date of birth associated with a social security number. As another example, the first supplemental data is a PIN number associated with an access number.

The first supplemental data 106 may be modified, resulting in updated supplemental data. As an example, a payment card issuer generates a payment card comprising a primary account number and an expiration date. When the card expires, the payment card issuer generates a new payment card comprising the same primary account number and an updated expiration date. As another example, an access card issuer changes an associated PIN number, resulting in an updated PIN number.

The second portable device 108 may be substantially similar to, or different than, the first portable device 102, described above. As an example, the second portable device 108 may be a mobile phone and the first portable device may be a credit card.

The token 104 may be a substitute value for a real credential. The second portable device 108 and/or the first portable device 102 may be pre-provisioned with a token 104. Alternatively, or additionally, token 104 may be provisioned responsive to a request made by an access device (e.g., second access device 114 or first access device 112), based on data obtained from a portable device (e.g., second portable device 108 or first portable device 102).

The second supplemental data 110 may be substantially similar in nature or format to the first supplemental data 106, described above, but may be different. As an example, the first supplemental data is an access code for a first employee and the second supplemental data is an access code for a second employee.

The first access device 112 may be associated with a merchant. The first access device 112 may, as examples, be a POS terminal at a merchant location or a remote server computer that operates a web site operated by the merchant. In some embodiments, the merchant operating the processor computer 118 may be a card-on-file (COF) merchant. The card-on-file merchant may store consumer account information in a remote database for future payments (e.g., recurring or periodic payments). The first access device 112 may be configured to generate an authorization request message for a transaction that is initiated by a user via the first portable device 102.

The second access device 114 may be substantially similar to, or different than, the first access device 112, described above. In an embodiment, the first access device 112 is a POS device (e.g., a card reader terminal at a physical store) and the second access device 114 is a website managing card-on-file transactions (e.g., an online store with stored credit card data).

In some embodiments, the second access device includes a processor and a computer-readable medium coupled to the processor. The computer-readable medium may comprise code, executable by the processor, to implement a method comprising: transmitting, by an access device to a computer, a request message; thereby causing the computer to generate a response message at least by: searching a supplemental database for updated supplemental data corresponding to a real credential, the supplemental database storing the real credential, supplemental data, and the updated supplemental data, wherein the updated supplemental data was provided to the supplemental database in connection with authorization processing involving the real credential, and wherein the computer received the updated supplemental data associated with the real credential; and, responsive to transmitting the request message, receiving, by the access device, the response message from the computer including the updated supplemental data corresponding to the real credential.

The transport computer 116 may be operated by an acquirer. An acquirer is typically a system for an entity (e.g., a bank) that has a business relationship with a particular merchant, a wallet provider, or another entity. The transport computer 116 may issue and manage an account of the merchant. In some embodiments, the transport computer 116 may forward the authorization request message to the processor computer 118 and the authorization response message to an access device (e.g., first access device 112 or second access device 114) during a transaction to confirm processing of a payment transaction.

The processor computer 118 may be configured to provide authorization services and clearing-and-settlement services for payment transactions. The processor computer 118 may include data processing subsystems, networks, and operations used to support and deliver authorization services, exception file services, and clearing and settlement services. An example of a payment processing network may include VisaNet™. Payment processing networks such as VisaNet™ are able to process credit card transactions, debit card transactions, and other types of commercial transactions. VisaNet™, in particular, includes a Visa Integrated Payments (VIP) system which processes authorization requests and a Base II system which performs clearing and settlement services. Furthermore, the payment processing network may include a server computer and may use any suitable wired or wireless telecommunications network, including the Internet.

The processor computer 118 may further include functionality to manage updating supplemental data, as described further below with respect to FIG. 2A.

The authorizing computer 124 may be a computer operated by an authorizing entity such as an account issuer, a transit agency, a secure location access provider, or a secure data access provider. Typically, an issuer is an entity (e.g., a bank) that issues and maintains an account of the user. The account may be a credit, debit, prepaid, or any other type of account.

The token service computer 122 may include functionality to service tokens. The token service computer 122 may include functionality to transmit and/or receive a request message. A request message may be a request to authorize a transaction. Alternatively, or additionally, a request message may be a request to provision a token.

The token service computer 122 may further include functionality to manage updating supplemental data and/or tokens, as described further below with respect to FIG. 2B.

The supplemental database 126 may be a storage unit and/or device (e.g., a file system, database, collection of tables, or other storage mechanism) for storing data. The supplemental database 126 may include multiple different storage units and/or devices. The supplemental database 126 may store a plurality of real credentials. The supplemental database 126 may further store supplemental data corresponding to the real credentials. Examples of data that may be stored to the supplemental database 126 are further detailed below with respect to FIG. 3.

Figure 2A:
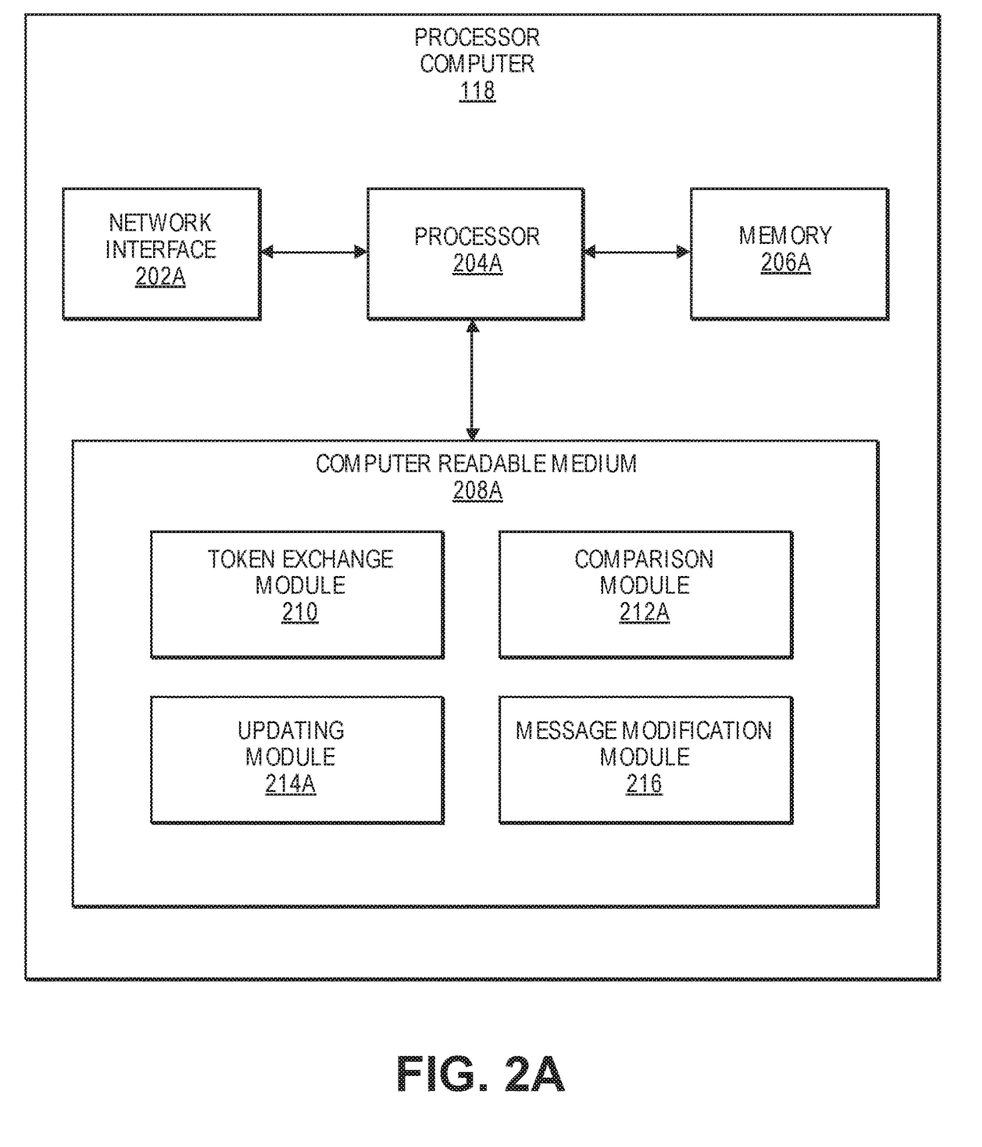
FIG. 2A shows a block diagram of a processor computer according to an embodiment of the invention.

FIG. 2A shows a detailed view of the processor computer 118. The processor computer 118 may include a processor 204A operatively coupled to a network interface 202A, a memory 206A, and a computer-readable medium 208A.

The network interface 202A can be configured to connect to one or more communication networks to allow processor computer 118 to communicate with other entities such as the transport computer 116, the token service computer 122, etc.

The processor 204A may be implemented as one or more integrated circuits (e.g., one or more single core or multicore microprocessors and/or microcontrollers). The processor 204A may be used to control the operation of the processor computer 118. Processor 204A can execute a variety of programs in response to program code or computer-readable code stored in memory 206A. Processor 205a may include functionality to maintain multiple concurrently executing programs or processes.

The memory 206A may be implemented using any combination of any number of non-volatile memories (e.g., flash memory) and volatile memories (e.g., DRAM, SRAM), or any other non-transitory storage medium, or a combination of media.

In some embodiments, the computer-readable medium 208A comprises code, executable by the processor 204A, to implement a method comprising: receiving, by a computer from the access device, a request message; searching, by the computer, a supplemental database for updated supplemental data corresponding to a real credential, the supplemental database storing the real credential, supplemental data, and the updated supplemental data, wherein the updated supplemental data was provided to the supplemental database in connection with authorization processing involving the real credential; receiving, by the computer, the updated supplemental data associated with the real credential; and transmitting, by the computer, a response message to the access device including the updated supplemental data.

The computer-readable medium 208A may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 208A may be any combination of such storage or transmission devices.

The computer-readable medium 208A may comprise software code stored as a series of instructions or commands The computer-readable medium 208A may comprise a token exchange module 210, a comparison module 212A, an updating module 214A, and a message modification module 216.

The token exchange module 210 may comprise code for receiving a token and identifying a corresponding real credential. The token exchange module 210 may also comprise code for receiving a real credential, and identifying and retrieving a corresponding token. The token exchange module 210 may be programmed to identify tokens and/or real credentials by transmitting a request to the token service computer 122.

The message modification module 216 may comprise code for receiving an authorization request message including a token, and then modifying the authorization request message to include a corresponding real credential. The message modification module 216 may further comprise code for receiving an authorization response message including a real credential. The message modification module 216 may further comprise code for substituting the real credential with a corresponding token.

The comparison module 212A may comprise code for comparing data. The comparison module 212A may compare a received real credential to a set of real credentials stored to the supplemental database 126. Upon identifying a match between the real credentials, the comparison module 212A may further, in conjunction with the processor 204A, compare supplemental data associated with the matching real credentials. The comparison module 212A may, in conjunction with the processor 204A, identify changes in the supplemental data. As an example, the comparison module 212A, in conjunction with the processor 204A, determines that a received expiration date, associated with a real credential, corresponds to a later date than a stored expiration date associated with the same real credential. Accordingly, the comparison module 212A, in conjunction with the processor 204A, determines that the received expiration date corresponds to updated supplemental data.

The updating module 214A may comprise code for updating data stored to the supplemental database 126. The updating module 214A may be programmed to replace supplemental data, stored to the supplemental database, with updated supplemental data identified by the comparison module 212A. As an example, the updating module may, in conjunction with the processor 204A, replace an expired expiration date stored to the supplemental database in association with a PAN with an updated expiration date, to be stored to the supplemental database in association with the same PAN.

Figure 2B:
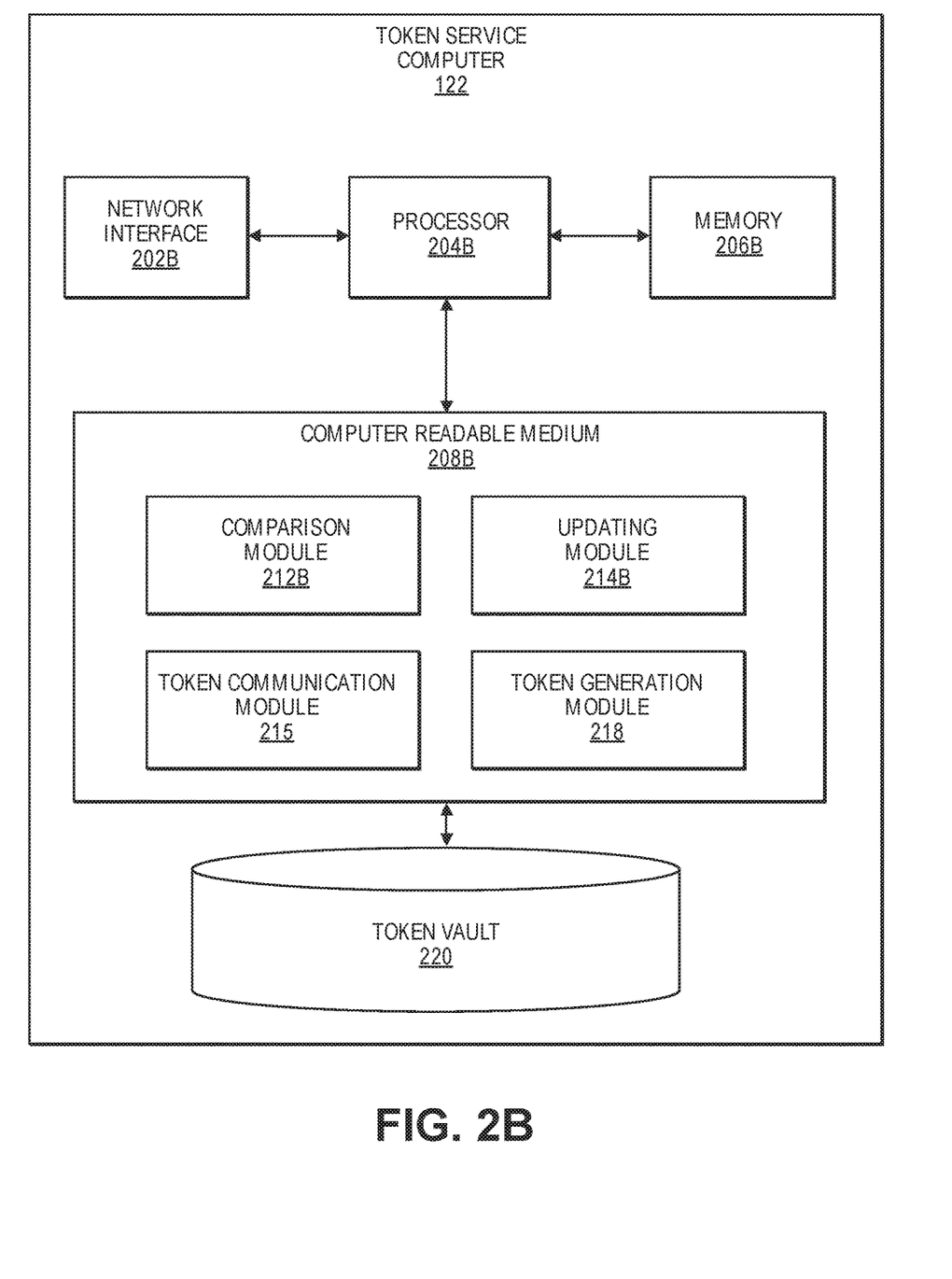
FIG. 2B shows a block diagram of a token service computer according to an embodiment of the invention.

FIG. 2B shows a detailed view of the token service computer 122 in accordance with one or more embodiments. The token service computer may include or be communicatively coupled to a token vault 220.

The token vault 220 may include a token mapping database that maintains established mappings of tokens to real credentials. The token vault may also maintain supplemental data associated with the tokens. Token vaults, due to the sensitive nature of the data mappings that are stored and managed in them, may be protected by strong underlying physical and logical security.

According to various embodiments, the token vault 220 may be part of the token service computer 122. The token vault 220 may be provided by (and/or managed by) a same entity or may be part of a same environment as the token vault 220. In other embodiments, the token vault 220 may be a storage external to and accessible by the token service computer 122 or individual elements of the token service computer 122 (e.g., the comparison module 212B or the token generation module 218).

The token service computer 122 may further include a processor 204B operatively coupled to a network interface 202B, a memory 206B, and/or a computer-readable medium 208B. The network interface 202B, processor 204B, memory 206B, and computer-readable medium 208B may be substantially similar to the network interface 202A, processor 204A, memory 206A, and computer-readable medium 208A, respectively, described above with respect to FIG. 2A. The computer-readable medium 208B may include a comparison module 212B, an updating module 214B, a token communication module 215, and a token generation module 218.

The comparison module 212B may comprise code for comparing data. The comparison module 212B may, in conjunction with the processor 204B, compare a received real credential to a set of real credentials stored to the supplemental database 126. Upon identifying a match between the real credentials, the comparison module 212B may further compare supplemental data associated with the matching real credentials. The comparison module 212B may, in conjunction with the processor 204B, identify changes in the supplemental data. As an example, the comparison module 212B, in conjunction with the processor 204B, determines that a received expiration date, associated with a real credential, corresponds to an earlier date than a stored expiration date associated with the same real credential. Accordingly, the comparison module 212A determines, in conjunction with the processor 204B, that the received expiration date corresponds to old supplemental data. Alternatively, or additionally, the comparison module 212B may be configured to continuously or periodically check the supplemental database 126 for updates.

The updating module 214B may comprise code for updating data in conjunction with the processor 204B, based on information identified in the supplemental database 126. The updating module 214B may, in conjunction with the processor 204B, update the token vault to reflect updated supplemental data identified in the supplemental database. Alternatively, or additionally, the updating module 214B may, in conjunction with the processor 204B, generate and transmit a notification of the updated supplemental data. As examples, the updating module 214B may be configured to update the processor computer 118 or the second access device 114 that updated supplemental data has been identified.

The token communication module 215 may, in conjunction with the processor 204B, receive a token request message from a token requester (e.g. the processor computer 118). The token request message may include a real credential and supplemental data associated with the real credential.

Upon receipt of the token request message, the token communication module 215 may, in conjunction with the processor 204B, pass the token request message to the token generation module 218. Prior to passing the token request message, the token communication module 215 may, in conjunction with the processor 204B, confirm that the real credential included in the token request message is eligible for tokenization. For example, the token communication module 215 may be configured to send the real credential to an authorizing computer 124 that may have issued the real credential. In some embodiments, the token communication module 215 may be configured to interact with a third-party entity to authenticate the real credential. However, embodiments are not limited to the token communication module 215 performing the authentication of the account identifier and any other component of the token service provider computer 206 may oversee the authentication of the account identifier included in the token request message.

The token generation module 218 may, in conjunction with the processor 204B, generate a token corresponding to the real credential in response to receiving the token request message. The token generation module 218 may then, in conjunction with the processor 204B, store the generated token to the token vault 220. The token generation module 218 may additionally be programmed to store supplemental data associated with the token to the token vault 220. Tokens may be generated before or after a token request has been received.

Figure 3:
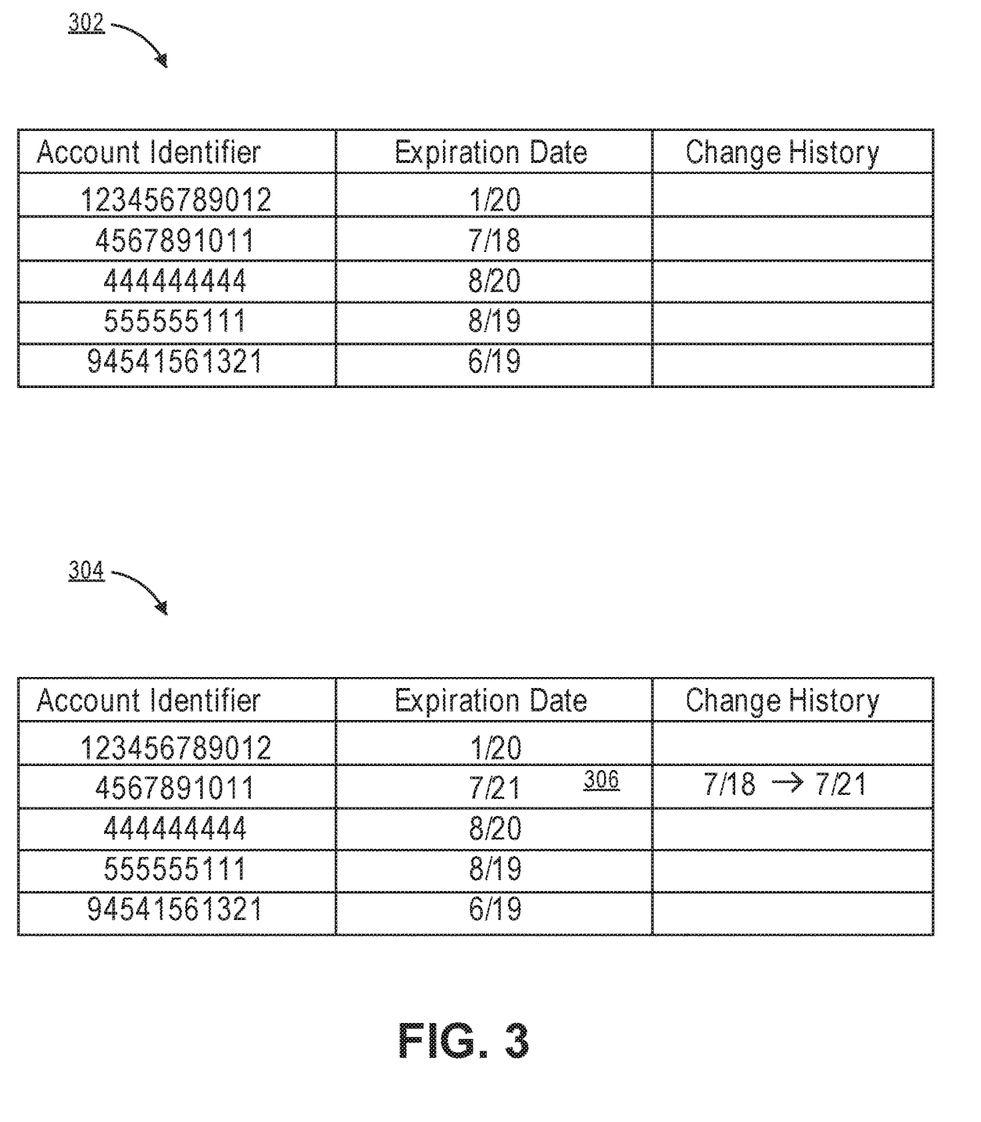
FIG. 3 shows examples of entries in a supplemental database according to an embodiment of the invention.

FIG. 3 illustrates examples of entries in the supplemental database 126. At a first time, the data 302 may include a plurality of account identifiers (e.g., real credentials). Each account identifier is associated with a respective expiration date. An expiration date is one example of a type of supplemental data that may be stored in association with a real credential. The supplemental database may store one or more types of supplemental data in association with each account identifier.

As shown in FIG. 3, the supplemental database 126 further includes functionality to store a change history associated with the expiration dates. The data at the first time 302 has not been updated. Accordingly, no change history is reflected in the data at the first time 302.

At a second time, the data 304 includes the plurality of account identifiers. The account identifiers are the same as those stored to the supplemental database at the first time. Each account identifier is associated with a respective expiration date. One of the expiration dates has been updated. The expiration date 306 corresponding to account identifier 4567891011 has been updated from July 18 to July 21, as reflected in the change history.

III. Methods

Figure 4:
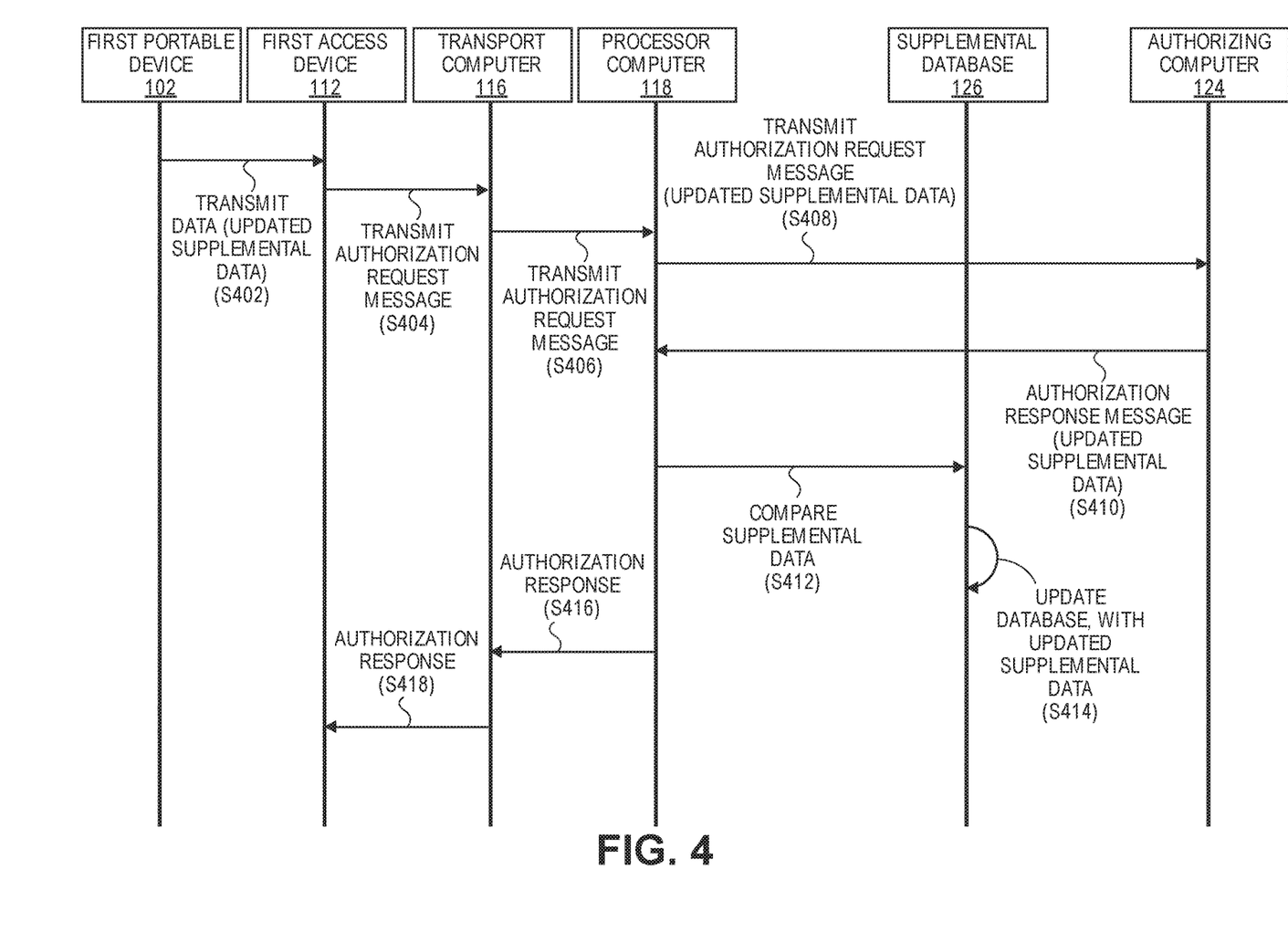
FIG. 4 shows example operations for updating supplemental data according to an embodiment of the invention.

A method for updating the supplemental database with updated supplemental data is described with respect to FIG. 4. Before step S402, the first portable device 102 may have a real credential and supplemental data stored in a memory. In some embodiments, the real credential may be a PAN, and the supplemental data may be an expiration date associated with the pan. The supplemental data may be new supplemental data, in that the supplemental data stored to the first portable device has been updated. As an example, the updated supplemental data may be an updated expiration date. One or more other devices in the system may not have yet received notification of the updated supplemental data.

At step S402, the first portable device 102 may initiate a transaction, or other suitable interaction, with the first access device 112. For example, a user may bring the first portable device 102 into contact range with the first access device 112. The first portable device 102 may transmit data associated with the transaction (e.g., the real credential and/or updated supplemental data) to the first access device 112.

At step S404, the first access device 112 generates an authorization request message. The authorization request message includes the updated supplemental data. Subsequent to generating the authorization request message, the first access device 112 may transmit the authorization request message to the transport computer 116.

At step S406, after receiving the authorization request message comprising the updated supplemental data, the transport computer 116 may transmit the authorization request message to the processor computer 118.

At step S408, after receiving the authorization request message comprising the updated supplemental data, the processor computer 118 may transmit the authorization request message to the authorizing computer 124.

At step S410, after receiving the authorization request message comprising the updated supplemental data, the authorizing computer 124 may determine whether or not to authorize the transaction. The authorizing computer 124 may generate an authorization response message comprising the updated supplemental data. The authorizing computer 124 may then transmit the authorization response message comprising the updated supplemental data to the processor computer 118.

At step S412, the processor computer 118 may receive the authorization response message. The processor computer 118 may then compare the updated supplemental data, received in the authorization response message, to the supplemental data stored to the supplemental database 126. If the updated supplemental data received in the authorization response message differs from the supplemental data stored to the supplemental database 126, then the processor computer 118 may determine that the supplemental data has been updated. Identifying updated supplemental data from the authorization request message may be advantageous in that, if the transaction is authorized, then the data comprised in the authorization response message is likely recent and valid.

If the processor computer 118 were to receive a real credential not already stored to the supplemental database, the processor computer 118 may identify both the real credential and the associated supplemental data as new data to be stored.

At step S414, the processor computer 118 updates the supplemental database 126 with the updated supplemental data received in the authorization response message. The system may delete the out-of-date supplemental data. The system may store the updated supplemental data in place of the out-of-date supplemental data. The system may store the updated supplemental data so as to map to the corresponding real credential. By doing so, subsequent transactions conducted with the updated supplemental data will not be rejected based on the supplemental data.

At step S416, the processor computer 118 may transmit the authorization response message to the transport computer 116.

At step S418, after receiving the authorization response message, the transport computer 116 may transmit the authorization response message to the first access device 112.

At the end of the day or at another suitable time, the transport computer 116, the processor computer 118, and the authorizing computer 124 may perform a clearing and settlement process after the transaction has been completed.

Figure 5:
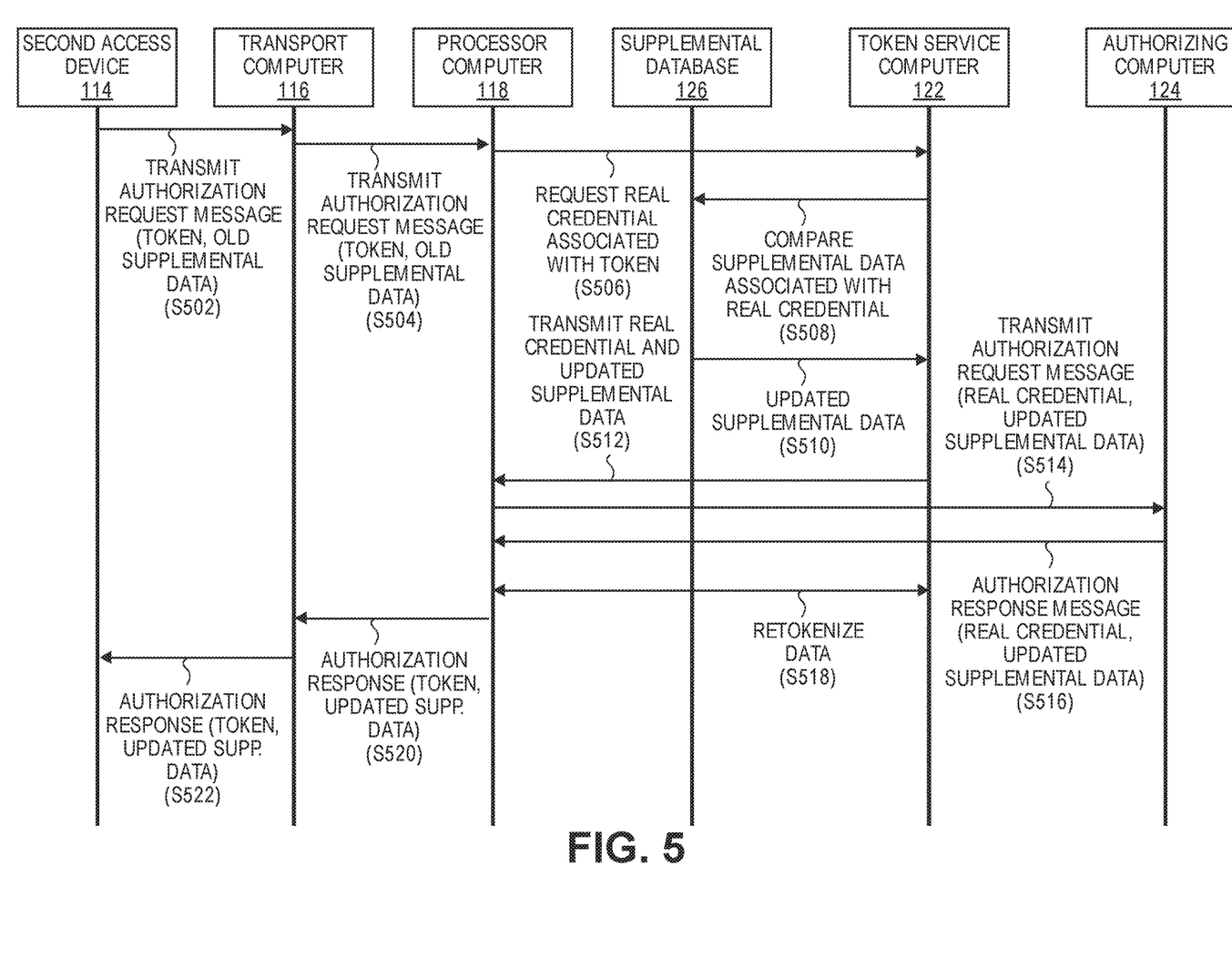
FIG. 5 shows a process flow according to an embodiment of the invention.

A method for authorization operations with updated supplemental data is described with respect to FIG. 5.

Before step S502, the second access device 114 may have a token and associated supplemental data stored in a memory. The second access device 114 may have previously obtained a real credential and associated supplemental data via the second portable device 108. The second access device 114 may have successfully provisioned a token, based on the real credential and the supplemental data. Illustratively, the second access device 114 may be a web server with an account on file. The account on file can be provisioned with a token.

The issuer of the real credential may have modified the supplemental data to generate updated supplemental data. However, prior to step S502, the second access device 114 may have not received notification that the supplemental data has been updated Thus, prior to step 502, the supplemental data stored to the second access device 114 is old supplemental data which does not reflect the update.

At step S502, the second access device 114 generates an authorization request message. The authorization request message includes the token and the old supplemental data. Subsequent to generating the authorization request message, the second access device 114 may transmit the authorization request message to the transport computer 116.

At step S504, after receiving the authorization request message comprising the token and the old supplemental data, the transport computer 116 may transmit the authorization request message, comprising the token and the old supplemental data, to the processor computer 118.

At step S506, after receiving the authorization request message from the transport computer 116, the processor computer 118 may request, from the token service computer 122, the real credential associated with the token. The request may include the token and the old supplemental data.

The token service computer 122 may identify a real credential which maps to the received token. The token service computer 122 may query the token vault to identify the real credential which maps to the token. The token service computer 122 may further execute operations for validating the token. The token validation operations may make use of the received supplemental data.

At step S508, the token service computer 122 checks the supplemental database 126 for updated supplemental data. Initially, the token service computer 122 may use the identified real credential to identify an entry in the supplemental database 126 which includes the same real credential. The token service computer 122 may compare the received old supplemental data, associated with the identified real credential, to the updated supplemental data, associated with the same real credential, stored in the supplemental database 126. Based on the comparison, the token service computer 122 may determine that the supplemental data has been updated.

At step S510, the token service computer 122 may retrieve the updated supplemental data. The token service computer 122 may store the updated supplemental data to the token vault or otherwise update the token vault based on identifying the updated supplemental data.

In some embodiments, the token service computer 122 may identify and update supplemental data at the time of tokenization. Alternatively, or additionally, the token service computer 122 may continuously or periodically check the supplemental database 126 for updates. As an example, the token service computer 122 may poll an application programming interface (API) of the token service computer to receive a notification whenever the supplemental data is updated. As another example, the token service computer may execute a query, on the supplemental database, for new supplemental data every 30 seconds. Upon detecting a change, the token service computer 122 may update the associated token.

At step S512, the token service computer 122 transmits the real credential and the updated supplemental data to the processor computer 118.

At step S514, the processor computer 118 may replace the token in the authorization request message with the real credential. The processor computer 118 may further replace the old supplemental data in the authorization request message with the updated supplemental data. The processor computer 118 may transmit the authorization request message comprising the real credential and the updated supplemental data to the authorizing computer 124.

At step S516, after receiving the authorization request message comprising the real credential and updated supplemental data, the authorizing computer 124 may determine whether or not to authorize the transaction. The authorizing computer 124 may determine whether or not to authorize the transaction based on the updated supplemental data and other factors. Other factors used to determine whether or not to authorize the transaction may include (1) whether enough funds or credit are available and/or (2) a risk check. The authorizing computer 124 may then generate an authorization response message comprising the real credential and the updated supplemental data. The authorizing computer 124 may then transmit the authorization response message comprising the real credential and the updated supplemental data to the processor computer 118.

At step S518, after receiving the authorization response message comprising the real credential and the updated supplemental data from the authorizing computer 124, the processor computer 118 may identify the token associated with the real credential, via token service computer 122. The processor computer 118 may replace the real credential in the authorization response message with the token.

At step S520, the processor computer 118 may transmit the authorization response message, comprising the token and the updated supplemental data, to the transport computer 116.

At step S522, the transport computer 116 may receive the authorization response message comprising the token and the updated supplemental data. The transport computer may then transmit the authorization message, comprising the token and the updated supplemental data, to the second access device 114.

After step S522, the second access device 114 may receive the authorization response message comprising the token and the updated supplemental data. The second access device 114 may then proceed with the transaction for which authorization was requested. The second access device 114 may further update the supplemental data stored therein to replace the old supplemental data with the received updated supplemental data.

At the end of the day or at another suitable time, the transport computer 116, the processor computer 118, and the authorizing computer 124 may perform a clearing and settlement process after the transaction has been completed.

Figure 6:
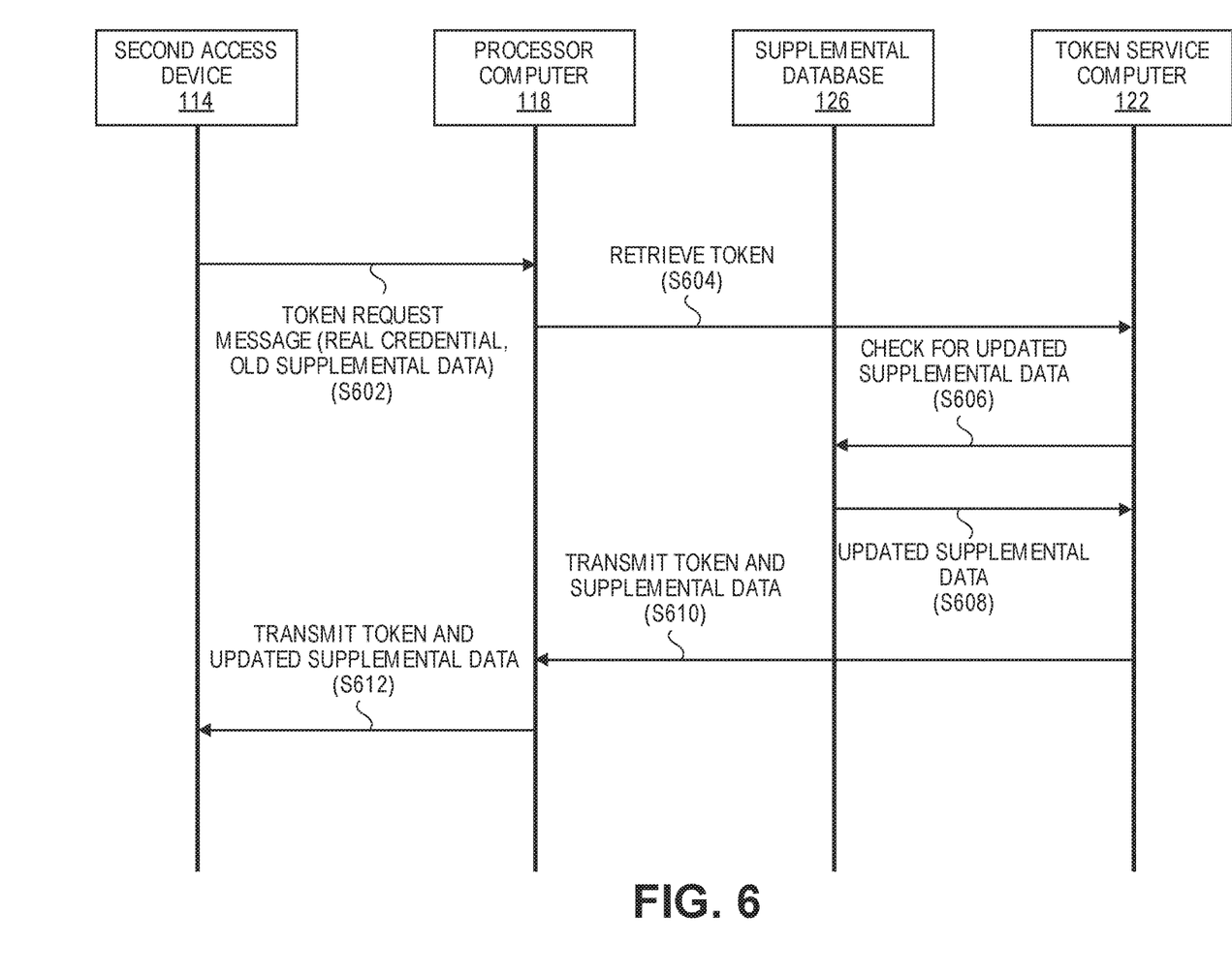
FIG. 6 shows a process flow according to another embodiment of the invention.

A method for provisioning a token with updated supplemental data is described with respect to FIG. 6. Before step S602, the second access device 114 may have a real credential and associated supplemental data stored in a memory. The second access device 114 may have previously obtained the real credential and the associated supplemental data via the second portable device 108 and/or entered via a web interface. The supplemental data may be old supplemental data, in that the supplemental data has been updated, but the second access device 114 has not yet been notified of the update. As an example, the issuer of a payment account may have updated the expiration date on a payment card subsequent to a merchant storing the payment card information to a card-on-file system.

At step S602, the second access device 114 generates a token request message. The token request message includes the real credential and the old supplemental data. Subsequent to generating the token request message, the second access device 114 may transmit the token request message to the processor computer 118.

At step S604, after receiving the token request message comprising the real credential and the old supplemental data, the processor computer may request a token from the token service computer. The token request may include the received real credential and old supplemental data.

At step S606, the token service computer 122 checks the supplemental database 126 for updated supplemental data. Initially, the token service computer 122 may use the real credential to identify an entry in the supplemental database 126 which includes the same real credential. The token service computer 122 may compare the received old supplemental data, associated with the real credential, to the updated supplemental data, associated with the same real credential, stored in the supplemental database 126. The token service computer 122 may determine that the supplemental data has been updated.

At step S608, the token service computer 122 may retrieve the updated supplemental data. The token service computer 122 may store the updated supplemental data to the token vault or otherwise update the token vault based on identifying the updated supplemental data.

In some embodiments, the token service computer 122 may identify and update supplemental data at the time of retrieving the token. Alternatively, or additionally, the token service computer 122 may continuously or periodically check the supplemental database 126 for updates. Upon detecting an update, the token service computer 122 may update the associated token.

At step S610, the token service computer 122 transmits the token and the updated supplemental data to the processor computer 118.

At step S612, the processor computer 118 may receive the token and the updated supplemental data. The processor computer 118 may then transmit the token and the updated supplemental data to the second access device 114.

After step S612, the second access device 114 may receive the token and the updated supplemental data. The second access device 114 may further update the supplemental data stored therein to replace the old supplemental data with the received updated supplemental data. In some embodiments, provisioning can occur regularly (e.g., once a week or once a day). The updated expiration date may stay the same if the underlying real credentials do not change.

The following example is described for purposes of clarity. Components and/or operations described in the example are specific examples which may not be applicable to certain embodiments, and should not be construed as limiting the scope of any of the claims.

A bank issues a credit card corresponding to an account, having PAN 12345678910 and expiration date June 18. The bank gives the credit card to a user. The user enters the PAN and expiration date to an online streaming service. The online streaming service obtains a token corresponding to the PAN from a token service computer. The streaming service stores the token and the expiration date. Using the token and the expiration date, the streaming service charges $10 to the account every month.

As the expiration date of June 18 nears, the bank issues a new credit card, with PAN 12345678910 and expiration date June 24. The bank sends the new credit card to the user. Neither the user nor the bank notifies the streaming service.

The user takes the new card to a coffee shop and purchases a cup of coffee. The POS terminal at the coffee shop sends an authorization request message comprising the PAN and the new expiration date of June 24 to a transport computer. The transport computer receives the authorization request message and forwards the authorization request message to a processor computer. The processor computer receives the authorization request message and forwards the authorization request message to an authorizing computer. The authorizing computer authorizes the transaction and sends an authorization response message to the processor computer. The authorization response message includes the new expiration date of June 24, the PAN, and an indication that the transaction is authorized.

The processor computer receives the authorization response message. The processor computer uses the PAN received therein to identify a corresponding entry in the supplemental database. The processor computer compares the corresponding expiration dates. The processor computer determines that the stored expiration date is June 18, and the received expiration date is June 24. Accordingly, the processor computer updates the expiration date stored in the supplemental database to reflect the new expiration date.

The processor computer transmits an authorization response message, comprising the PAN and the updated expiration date of June 24, to the transport computer. The transport computer receives the authorization response message and transmits the authorization response message to the POS terminal at the coffee shop.

The token service computer continuously pings the supplemental database for updates. Upon determining that the expiration date corresponding to PAN 12345678910 has been updated, the token service computer updates the stored token data corresponding to that PAN to reflect the updated expiration date.

The next day, the streaming service attempts to make the monthly charge to the account. The streaming service transmits an authorization request message, comprising the token and the old expiration date of June 18, to the transport computer. The transport computer receives the authorization request message and sends the authorization request message to the processor computer. The processor computer requests the PAN corresponding to the token from the token service computer. The token service computer identifies the token entry in the token vault and retrieves the PAN. As the token service computer has already updated the token data, the token vault contains the updated expiration date of June 24. The token service computer transmits the PAN and the updated expiration date to the processor computer.

The processor computer modifies the authorization request message to include the PAN and the updated expiration date of June 24. The processor computer transmits the modified authorization request message to the authorizing computer. Based on the PAN and the updated expiration date, the authorizing computer authorizes the transaction. The authorizing computer transmits an authorization response message, comprising the PAN, the updated expiration date, and an indication that the transaction is approved, to the processor computer.

The processor computer receives the authorization response message comprising the PAN, the updated expiration date, and an indication that the transaction is approved. The authorizing computer transmits the PAN to the token service computer, and receives the corresponding token in response. The processor computer replaces the PAN in the received authorization response message with the token. The processor computer transmits the modified authorization response message to the transport computer. The transport computer transmits the authorization response message, with the token and the updated expiration date, to the streaming service. The streaming service may update the stored expiration date in its system based on the information received in the authorization response message.

Embodiments of the invention have a number of advantages. For example, embodiments of the invention allow for the processor computer to learn from data captured in approved transactions in order to maintain refreshed supplemental data. By capturing data from approved transactions, data may be refreshed more frequently than if the processor computer were to rely on updates from the issuer of the supplemental data. Further, the data captured from approved transactions may be more accurate than data obtained from issuer updates, as the data captured from approved transactions was just validated.

Embodiments of the invention have a number of additional advantages. For example, token data remains up-to-date. By updating the token data without the need to receive updated supplemental data from an access device, there is no longer a reliance on the access device having the latest supplemental data in order to provision a token. Further, the system can provide token requesters with updated supplemental data. Additionally, the system leverages messages already being sent, without the need to tie up the system with additional messages regarding the updated supplemental data.

Although examples are described in the context of payment, the methods described herein are applicable in other contexts. As an example, embodiments of the invention may update supplemental data used to access a building. As another example, embodiments of the invention may update supplemental data used to verify an identity (e.g., verifying identity with a government agency or verifying age for the purchase of alcohol).

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium according to an embodiment of the present invention may be created using a data signal encoded with such programs. Computer readable media encoded with the program code may be packaged with a compatible device or provided separately from other devices (e.g., via Internet download). Any such computer-readable medium may reside on or within a single computer product (e.g, a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by a token service computer from an access device, an authorization request message comprising a token;
receiving, by a supplemental database, updated supplemental data corresponding to a real credential from a processor computer which received the updated supplemental data in a first authorization response message from an authorizing computer, the supplemental database storing the real credential, supplemental data, and the updated supplemental data;
searching, by the token service computer, the supplemental database for the updated supplemental data;
receiving, by the token service computer, the updated supplemental data associated with the real credential; and
transmitting, by the token service computer, a second authorization response message to the access device including the updated supplemental data and the token.

2. The method of claim 1, further comprising:
replacing the token in the authorization request message with the real credential; and
replacing the real credential in the second authorization response message with the token and the updated supplemental data.

3. The method of claim 1, wherein searching, by the token service computer, the supplemental database comprises continuously monitoring the supplemental database for updates.

4. The method of claim 1, wherein the token service computer comprises a token mapping database comprising data mapping the real credential to the token and the supplemental data, and the method further comprises storing the updated supplemental data to the token mapping database.

5. A system comprising:
a token service computer comprising:
a processor; and
a non-transitory computer-readable medium comprising code, executable by the processor, to implement a method comprising:
receiving, by the token service computer from an access device, an authorization request message comprising a token;
receiving, by a supplemental database, updated supplemental data corresponding to a real credential from a processor computer which received the updated supplemental data in a first authorization response message from an authorizing computer, the supplemental database storing the real credential, supplemental data, and the updated supplemental data;
searching, by the token service computer, the supplemental database for the updated supplemental data;
receiving, by the token service computer, the updated supplemental data associated with the real credential; and
transmitting, by the token service computer, a second authorization response message to the access device including the updated supplemental data and the token.

6. The system of claim 5, the method further comprising:
replacing the token in the authorization request message with the real credential; and
replacing the real credential in the second authorization response message with the token and the updated supplemental data.

7. The system of claim 5, wherein searching, by the token service computer, the supplemental database comprises continuously monitoring the supplemental database for updates.

8. The system of claim 5, wherein the token service computer comprises a token mapping database comprising data mapping the real credential to the token and the supplemental data, and the method further comprises storing the updated supplemental data to the token mapping database.

9. A method comprising:
transmitting, by an access device to a token service computer, an authorization request message comprising a token;
thereby causing the token service computer to generate a response message at least by: searching a supplemental database for updated supplemental data corresponding to a real credential, the supplemental database storing the real credential, supplemental data, and the updated supplemental data, wherein the updated supplemental data was provided to the supplemental database in connection with authorization processing involving the real credential, and wherein the token service computer received the updated supplemental data associated with the real credential, wherein the supplemental database received the updated supplemental data from a processor computer which received the updated supplemental data in an authorization response message from an authorizing computer; and
responsive to transmitting the authorization request message, receiving, by the access device, the response message from the token service computer including the updated supplemental data corresponding to the real credential and the token.

10. The method of claim 9, wherein searching, by the token service computer, the supplemental database comprises continuously monitoring the supplemental database for updates.

11. The method of claim 9, wherein the token service computer comprises a token mapping database comprising data mapping the real credential to the token and the supplemental data, and the method further comprises storing the updated supplemental data to the token mapping database.

* * * * *